US007406760B2

(12) United States Patent
Ledbetter

(10) Patent No.: US 7,406,760 B2
(45) Date of Patent: Aug. 5, 2008

(54) FORMING TOOL FOR USE IN A MACHINE FOR MAKING ARMORED CABLE

(75) Inventor: Scotty Joe Ledbetter, Bowdon, GA (US)

(73) Assignee: Southwire Company, Carrollton, GA (US)

( * ) Notice: Subject to any disclaimer, the term of this patent is extended or adjusted under 35 U.S.C. 154(b) by 338 days.

(21) Appl. No.: 11/121,663

(22) Filed: May 4, 2005

(65) Prior Publication Data

US 2005/0268458 A1 Dec. 8, 2005

Related U.S. Application Data

(60) Provisional application No. 60/568,365, filed on May 5, 2004.

(51) Int. Cl.
*B23P 19/00* (2006.01)
*H01B 7/18* (2006.01)

(52) U.S. Cl. ............................ 29/748; 29/749; 29/753; 29/761; 29/762; 29/757; 74/502.4; 74/500.5

(58) Field of Classification Search .................. 29/748, 29/753, 761, 762, 757, 749, 755; 439/394, 439/408, 580, 109; 174/103, 102 R, 113 R, 174/110 F; 74/502.4, 502.6, 500.5, 503, 74/504

See application file for complete search history.

(56) References Cited

U.S. PATENT DOCUMENTS

| | | | | |
|---|---|---|---|---|
| 1,966,516 | A * | 7/1934 | Phillips | 156/55 |
| 1,995,866 | A * | 3/1935 | Schneider | 29/728 |
| 3,242,661 | A * | 3/1966 | Siler | 242/442 |
| 4,205,888 | A * | 6/1980 | Wade | 439/98 |
| 5,350,885 | A * | 9/1994 | Falciglia et al. | 174/112 |
| 6,255,592 | B1 * | 7/2001 | Pennington et al. | 174/103 |
| 6,501,027 | B1 * | 12/2002 | Belli et al. | 174/110 F |

* cited by examiner

*Primary Examiner*—A. Dexter Tugbang
*Assistant Examiner*—Tai Nguyen
(74) *Attorney, Agent, or Firm*—Hope Baldauff Hartman, LLC

(57) ABSTRACT

The inventions presented herein provide an armor forming tool for use with an armor forming machine. The machine feeds a continuous strip of metal to a sub-assembly of a cable so as to wrap the continuous strip around the sub-assembly. The tool applies appropriate pressures to the wrapped continuous strip to form an interlocked armor.

4 Claims, 7 Drawing Sheets

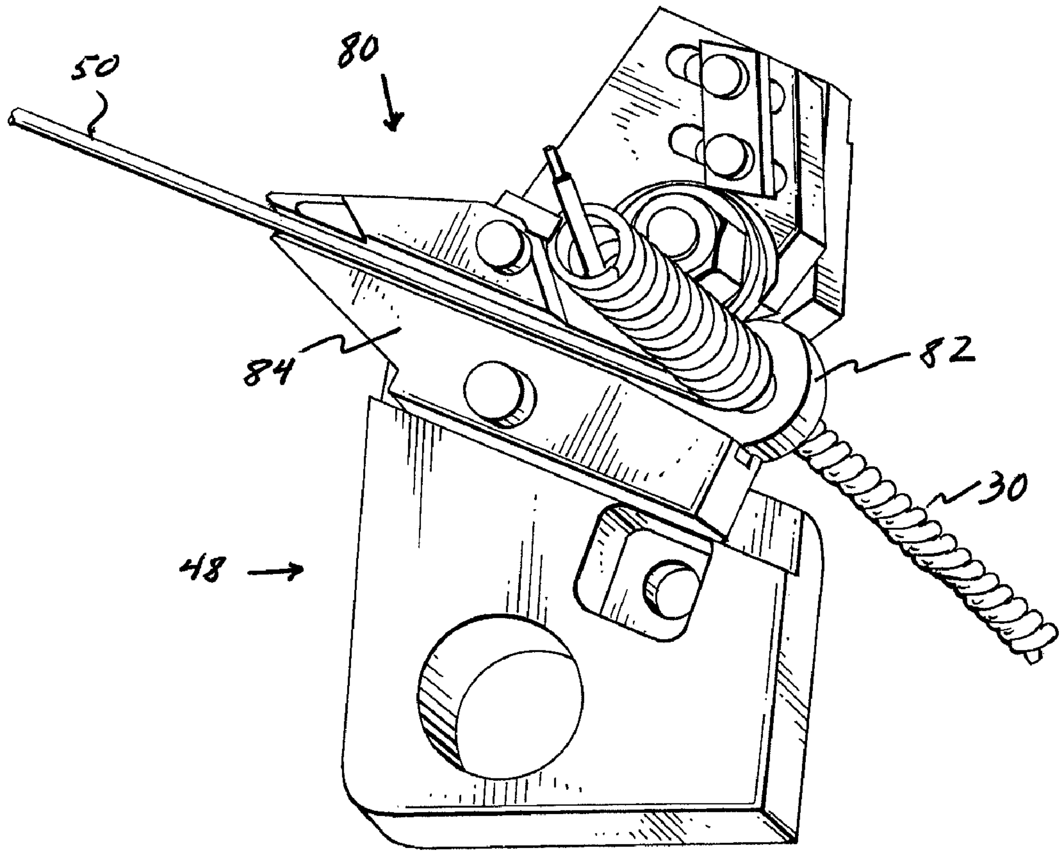
Figure 3
Figure 4
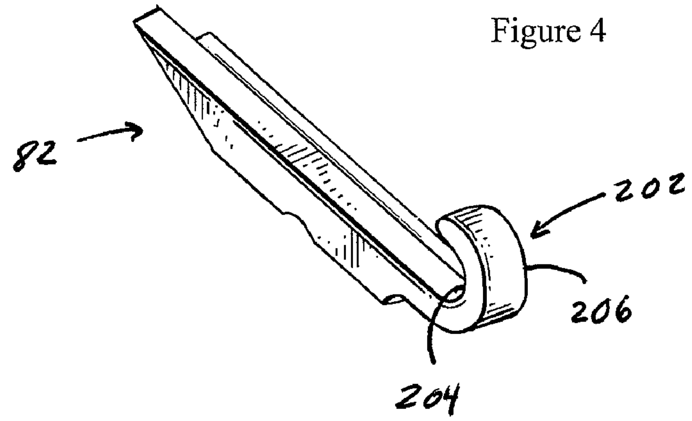

FORMING TOOL FOR USE IN A MACHINE FOR MAKING ARMORED CABLE

CROSS-REFERENCE TO RELATED APPLICATION

This application claims priority from U.S. Provisional Application No. 60/568,365 filed May 5, 2004, the contents of which are incorporated herein by reference.

BACKGROUND

The inventions described herein relate to tools and machines used to form the interlocked armor portion of a power cable of the type generally shown in FIG. 1.

A prior art armor forming tool, shown in FIG. 2 (Prior Art), is referred to generally by reference numeral 100. Forming tool 100 includes an upper pigtail member 102 and a lower guide shoe 104. The upper pigtail member is formed as two pieces 106 and 108 that when assembled with the guide shoe, form a gap 110 therebetween. The one piece forming tool described below was developed because the prior art two piece tooling had variations in height and metal fines/shavings filled the gap between the two pieces causing quality issues such as rough armor and strip breaks. The trials with the one piece forming tool resulted in better quality armored wire and cable than the prior art tooling, longer production runs, less machine downtime, and lower maintenance costs.

The use of the one piece forming tool including an upper pigtail member and a lower guide shoe member reduces damage to the continuous strip of metal as it passes through the tool and is formed into interlocked armor because the strip no longer passes over a discontinuity (gap). Also, the use of a single piece upper pigtail member reduces the chance that a replacement part will not match. This reduces or eliminates the variation of the height from the prior art replacement parts and thus reduces or eliminates any tendency to scrape or scratch the strip thereby improving the overall quality of armored wire and cable products.

The forming tool described herein improves overall quality of the armored surface, improves production by lessening problems with strip breaks, and minimizes variations from the armor forming process.

BRIEF DESCRIPTION OF THE DRAWINGS

FIG. 3 is a partial perspective view of a strip armor machine 48, showing forming tool 80 in place.

FIG. 4 is a perspective view of pigtail member 82.

DETAILED DESCRIPTION

The inventions described and claimed herein are directed to a strip armor forming tool useful as part of a strip armoring machine used to produce armored wire and cable.

Figure 1:
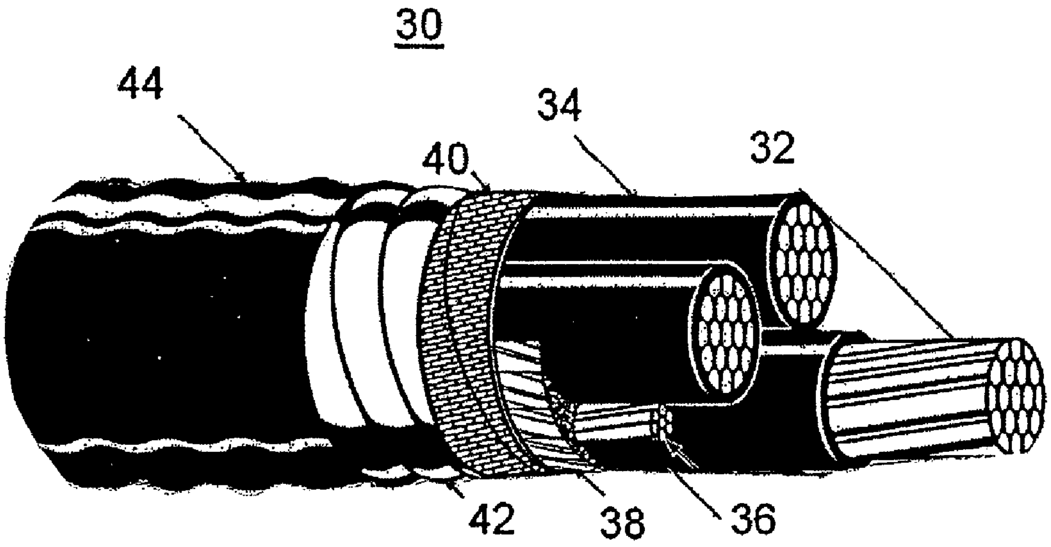
FIG. 1 shows a typical armored cable 30 of the type produced using a strip armor machine incorporating the strip armor forming tool described herein.
Figure 2:
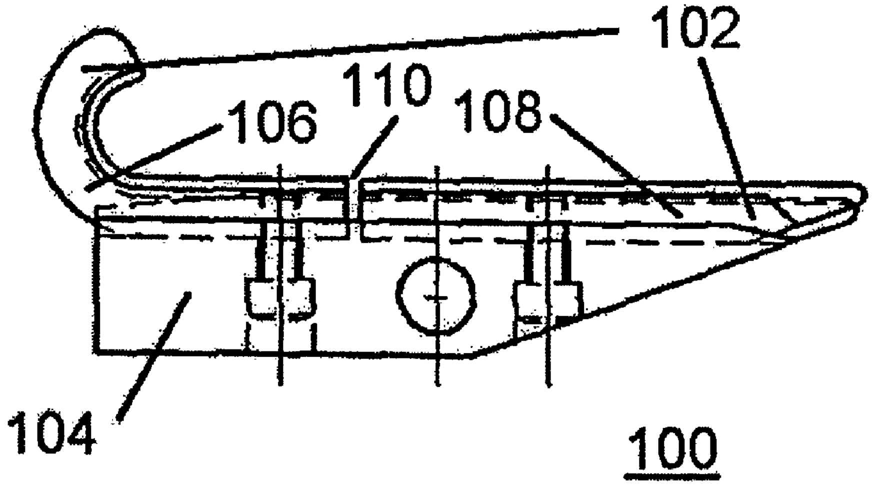
Figure 2 Prior Art
FIG. 2 (Prior Art) is a front view of a known forming tool.

FIG. 1 shows a typical armored cable 30 of the type produced using a strip armor machine incorporating the strip armor forming tool described herein. Cable 30 includes three compressed copper conductors 32 each having an XLP insulation 34 wrapped there around; a grounding conductor 36; and filler material 38. The aforementioned components are wrapped in a binder tape 40. At this stage of production, the cable sub-assembly is fed through the strip armoring machine to form an interlocked armor 42. After interlocked armor 42 is applied to cable 30, a PVC jacket 44 is wrapped around interlocked armor 42 to complete assembly of cable 30. The construction of cable 30 is merely exemplary. The armor forming tool is useful in providing interlocking armor for a variety of cable types and constructions.

FIG. 3 is a perspective view of a portion of strip armor machine 48 showing the installation of a new and improved armor forming tool 80. Armor forming tool 80 includes a pigtail member 82 and a guide shoe 84. Pigtail member 82 is seated on guide shoe 84 and is attached so as to form part of machine 48. Guide shoe 84 properly positions pigtail member 82. Forming tool 80 is attached to the hub of machine 48 and rotates along with the various rollers and pulleys, described above, that feed the continuous strip of metal 50 so as to wrap around a sub-assembly of cable 30. Pigtail member 82 is positioned in a manner that the curved portion of pigtail member 82 rotates around the sub-assembly of cable 30 to which armor is to be applied as it is fed through the hole in the center of the hub of machine 48. As pigtail member 82 rotates around the sub-assembly of cable 30 it applies pressure to the wrapped strip of metal to "finish" it as interlocked armor.

The use of a one piece pigtail member 82 vis-à-vis the prior art two piece member reduces damage to continuous metal strip 50 as it passes through the tool and is formed into interlocked armor 42. The continuous metal strip 50 no longer passes over a discontinuity between two mating parts. This reduces the chance that a replacement of only the curved portion of the prior art pigtail member will not match. The use of a one piece pigtail member reduces or eliminates the variation of the height between the two portions of the prior art pigtail member and thus reduces or eliminates any tendency to scrape or scratch the strip thereby improving the overall quality of armored wire and cable products.

FIG. 4 is a perspective view of pigtail member 82. The pitch of region 202 is produced by a bending jig shown in FIG. 5. Portions 204 and 206 have a/1;32" radius of curvature in the preferred embodiment.

Figure 5:
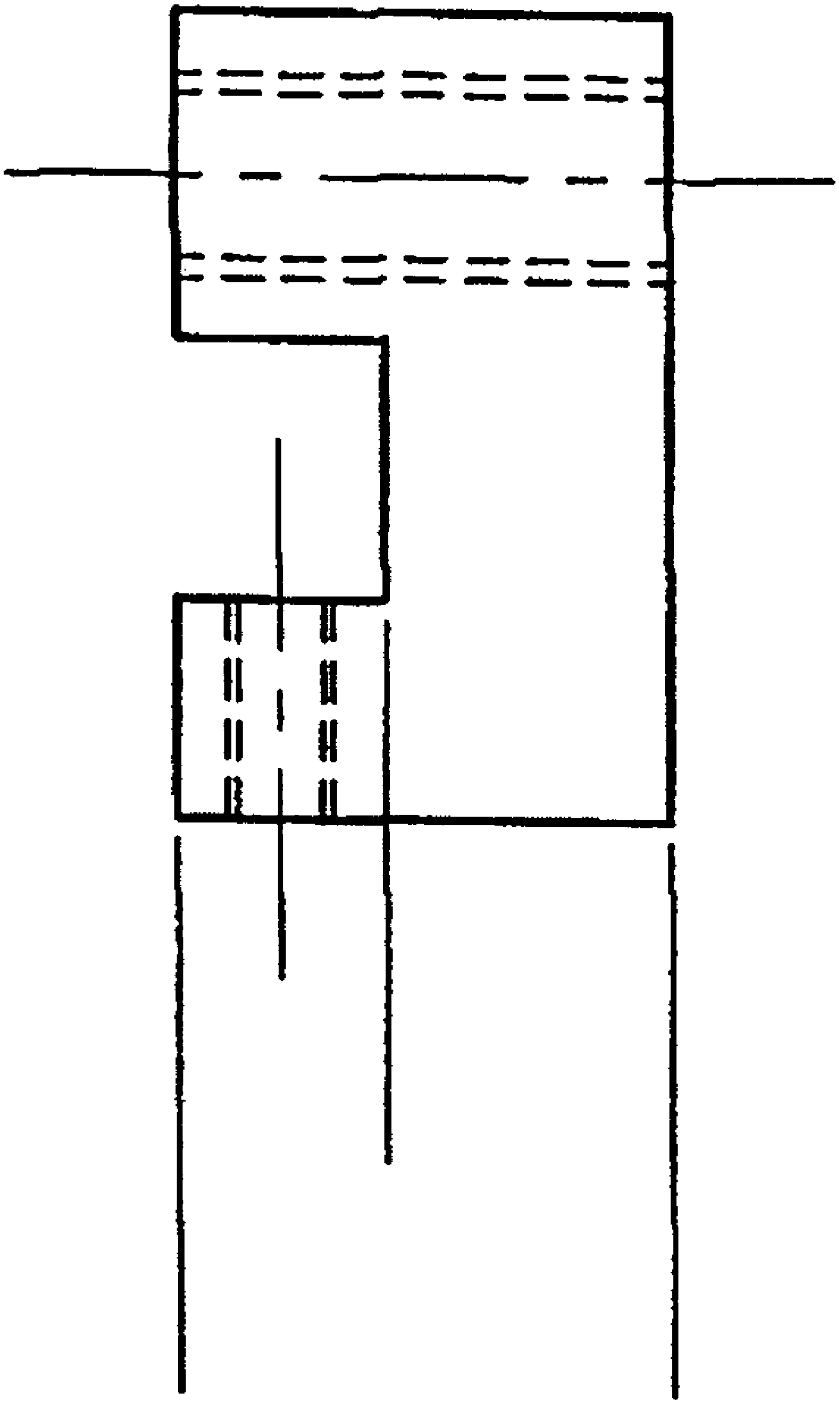
FIG. 5 is a side view of the bending jig.

FIG. 5 is a side view of a bending jig for making pigtail member 82. Although it is not part of the inventions claimed, details of the bending jig are included herein so as to be absolutely certain that it is fully taught how to make pigtail member 82.

Figure 6:
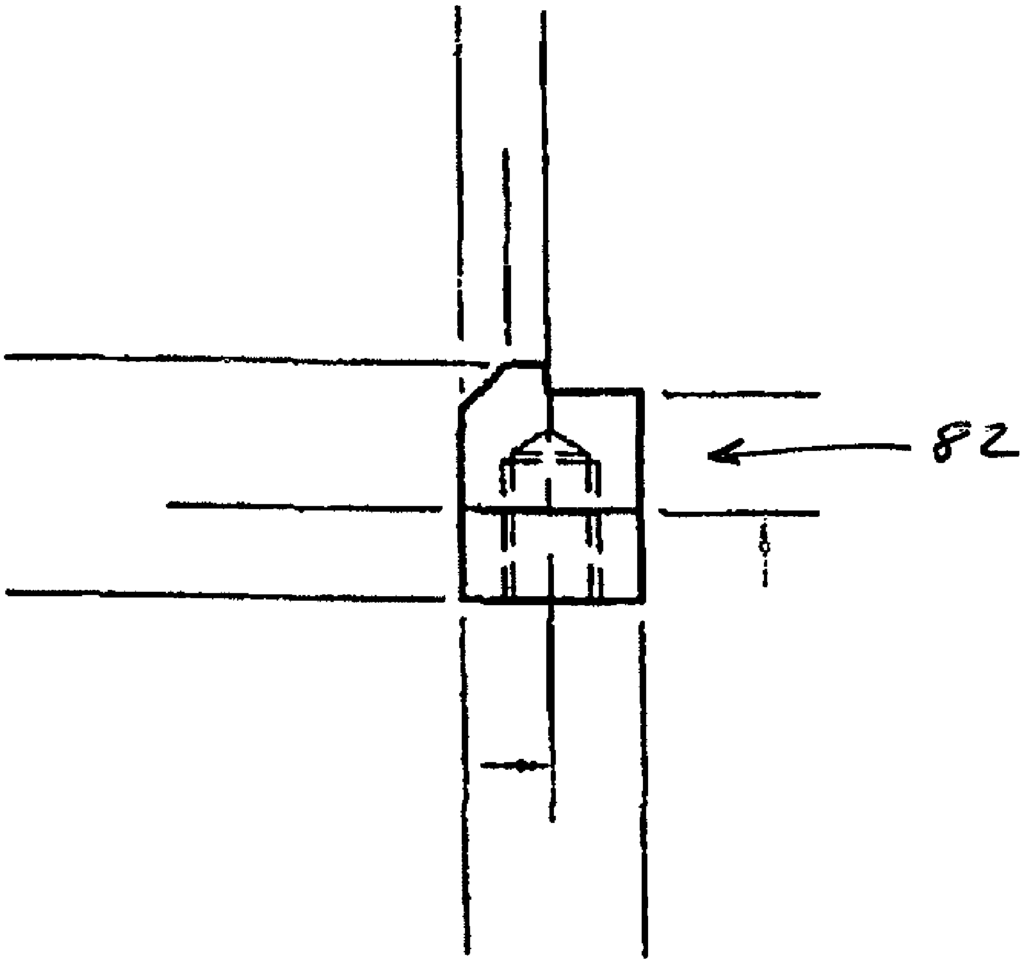
FIG. 6 is a side view of pigtail member 82 before being applied to the bending jig for bending.

FIG. 6 is a side view of pigtail member 82 before being applied to the bending jig for bending.

Figure 7:
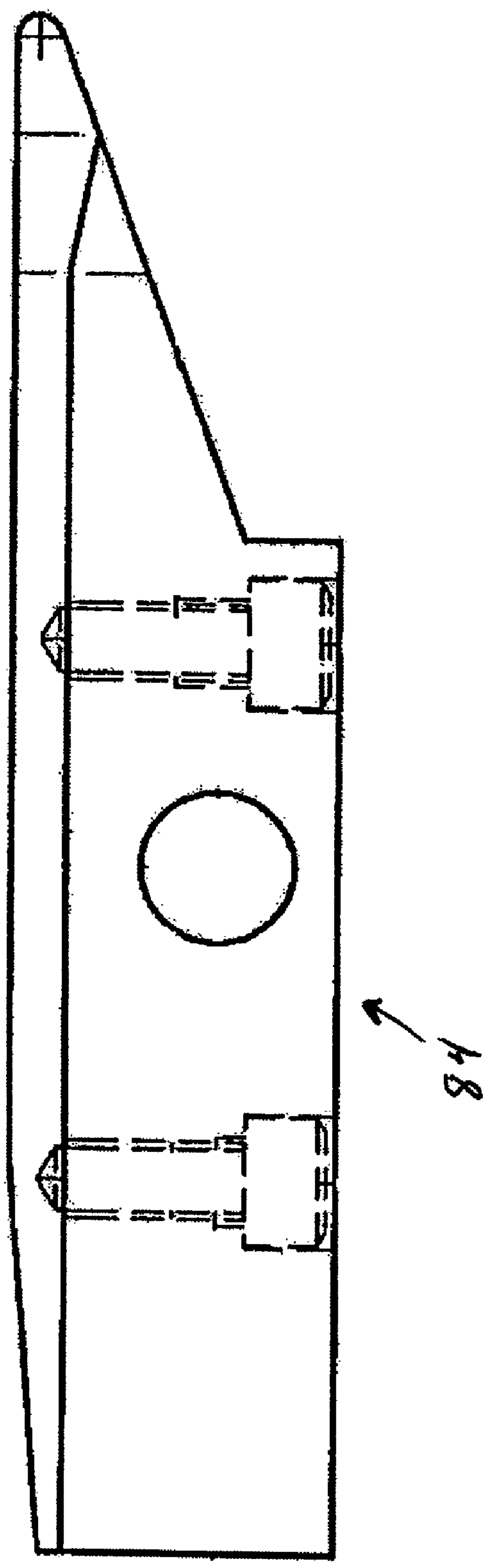
FIG. 7 is a front view of guide shoe member 84.

FIG. 7 is a front view of guide shoe member 84.

Figure 8:
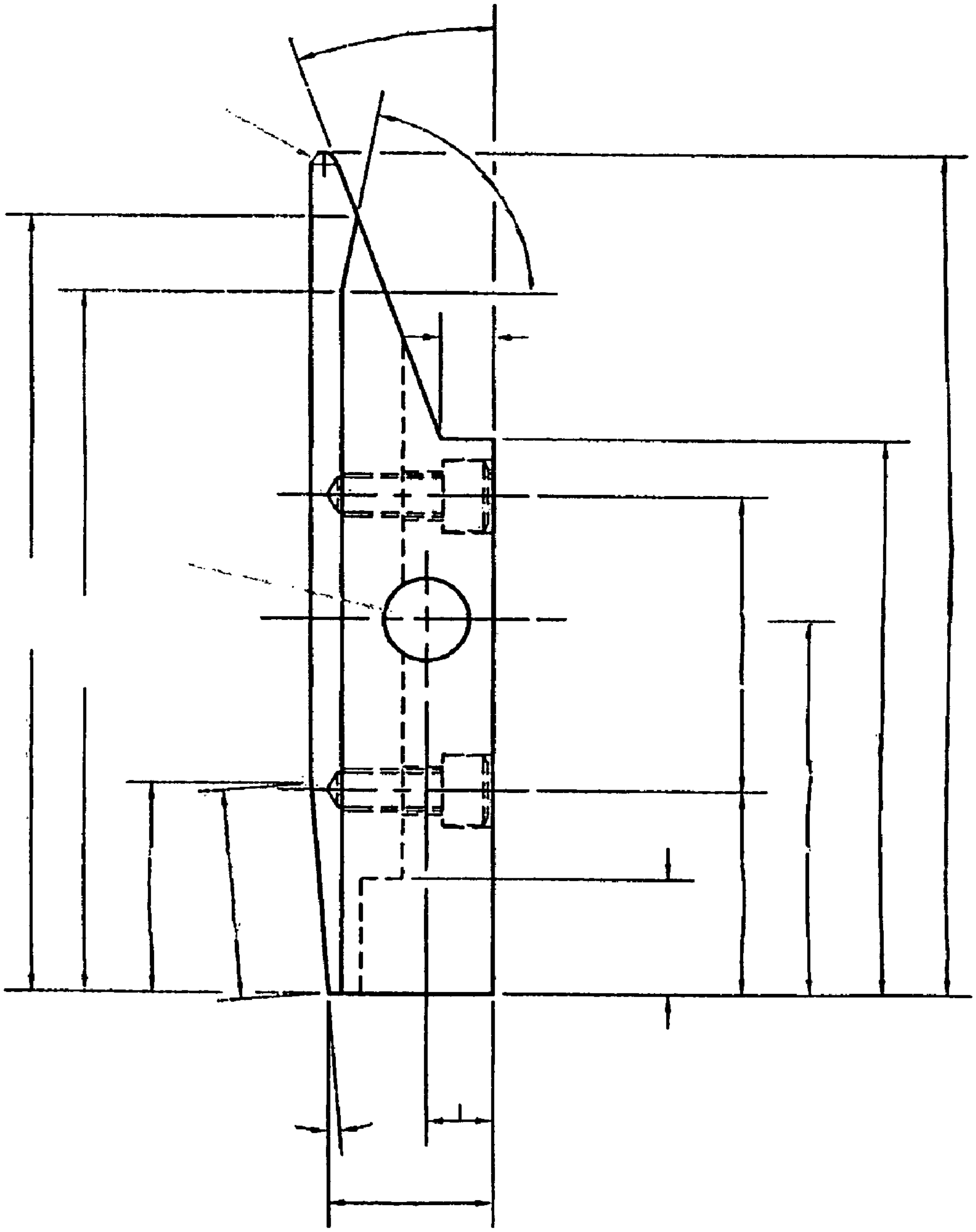
FIG. 8 is a front view of guide shoe member 84 showing dimensions of the presently preferred embodiment.

FIG. 8 is a front view of guide shoe member 84 showing dimensions of the presently preferred embodiment so that it can be accurately reproduced.

Figure 9:
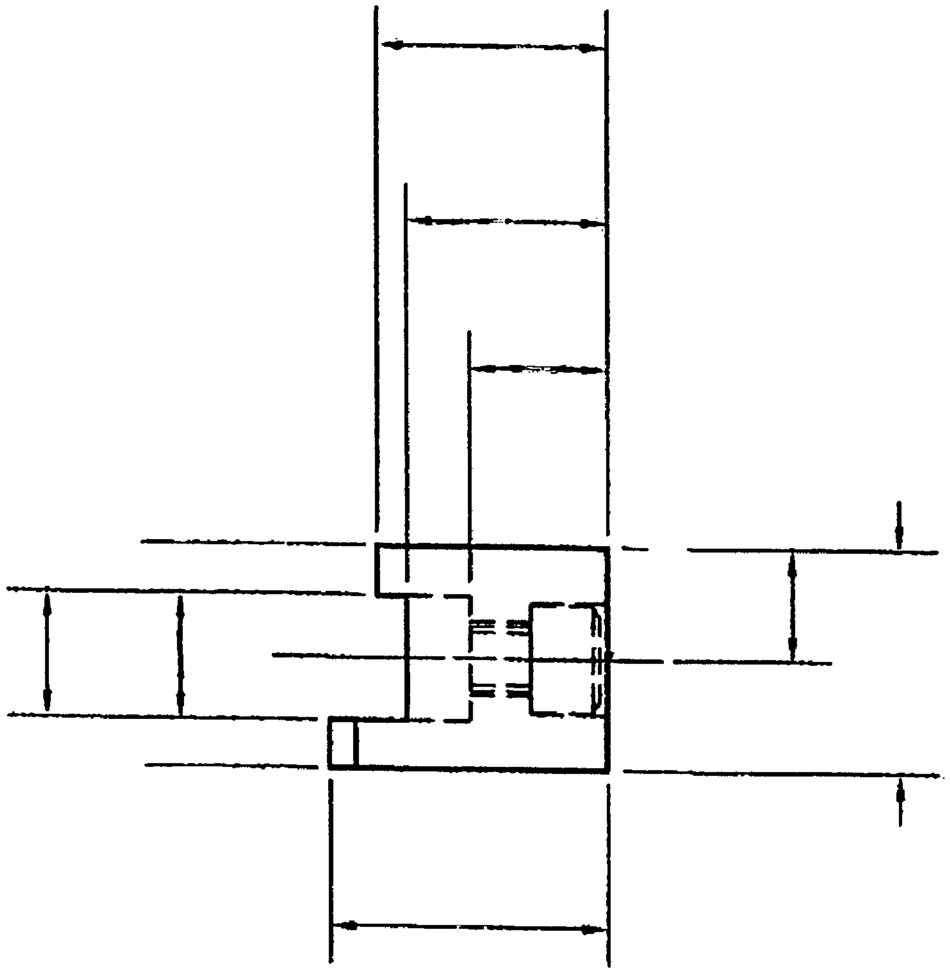
FIG. 9 is a side view of guide shoe member 84.

FIG. 9 is a side view of guide shoe member 84.

What is claimed is:

1. A forming tool for use in an armor forming machine that forms interlocked armor of an armored cable, comprising:

an integrally formed one piece pigtail member having a straight portion and a curved portion, the pigtail member mounted on a guide shoe affixed to a hub of an armor forming machine, the curved portion defining a space through which a sub-assembly of a cable can pass, the pigtail member being further constructed and arranged so that rotation of the guide shoe and pigtail member relative to the cable applies pressure to a continuous strip of metal passing through the pigtail member as the continuous strip is wrapped around the cable so as to form an interlocked armor thereabout.

2. A forming tool according to claim 1 wherein the pigtail member has a drill and tap therein for mounting it to the guide shoe.

3. A forming tool according to claim 2 wherein the pigtail member has at least two drill and taps therein for mounting it to the guide shoe.

4. A forming tool for use in an armor forming machine that forms interlocked armor of an armored cable, comprising:

a one piece pigtail member having a curved portion defining a space through which a sub-assembly of a cable can pass, the pigtail member connected to a guide shoe associated with a hub of an armor forming machine;

wherein the pigtail member is configured to apply pressure to a continuous strip of metal passing through the pigtail member as the continuous strip is wrapped around the cable so as to form an interlocked armor thereabout when the pigtail member rotates relative to the cable.

* * * * *